United States Patent
Marcille et al.

(10) Patent No.: US 10,822,491 B2
(45) Date of Patent: Nov. 3, 2020

(54) COMPOSITION OF POLYESTER AND THERMOPLASTIC STARCH, HAVING IMPROVED MECHANICAL PROPERTIES

(71) Applicant: Roquette Freres, Lestrem (FR)

(72) Inventors: Sophie Marcille, Lille (FR); Hélène Amedro, Bethune (FR); Nicolas Descamps, Sainghin-en-Melantois (FR); Thomas Buche, Andres (FR); René Saint-Loup, Lomme (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 15/527,301

(22) PCT Filed: Nov. 17, 2015

(86) PCT No.: PCT/FR2015/053100
§ 371 (c)(1),
(2) Date: May 16, 2017

(87) PCT Pub. No.: WO2016/079414
PCT Pub. Date: May 26, 2016

(65) Prior Publication Data
US 2018/0327587 A1 Nov. 15, 2018

(30) Foreign Application Priority Data

Nov. 17, 2014 (FR) .................................... 14 61080
Nov. 17, 2014 (FR) .................................... 14 61081
Nov. 17, 2014 (FR) .................................... 14 61082
May 29, 2015 (FR) .................................... 15 54884

(51) Int. Cl.
| | | |
|---|---|---|
| C08L 67/02 | (2006.01) | |
| C08J 5/18 | (2006.01) | |
| C08L 3/02 | (2006.01) | |
| C08K 5/00 | (2006.01) | |
| C08K 5/103 | (2006.01) | |
| C08K 5/053 | (2006.01) | |
| C08L 67/04 | (2006.01) | |
| C08K 5/092 | (2006.01) | |
| C08J 3/12 | (2006.01) | |
| C08J 3/20 | (2006.01) | |
| C08J 3/18 | (2006.01) | |

(52) U.S. Cl.
CPC .............. *C08L 67/02* (2013.01); *C08J 3/12* (2013.01); *C08J 3/18* (2013.01); *C08J 3/203* (2013.01); *C08J 5/18* (2013.01); *C08K 5/0016* (2013.01); *C08K 5/053* (2013.01); *C08K 5/092* (2013.01); *C08K 5/103* (2013.01); *C08L 3/02* (2013.01); *C08L 67/04* (2013.01); *C08J 2300/16* (2013.01); *C08J 2303/02* (2013.01); *C08J 2367/02* (2013.01); *C08J 2403/02* (2013.01); *C08J 2467/02* (2013.01); *C08J 2467/04* (2013.01); *C08L 2201/06* (2013.01); *C08L 2205/025* (2013.01); *C08L 2205/03* (2013.01); *C08L 2205/06* (2013.01)

(58) Field of Classification Search
CPC .................................... C08L 67/02; C08L 3/02
See application file for complete search history.

(56) References Cited

U.S. PATENT DOCUMENTS

| | | | | |
|---|---|---|---|---|
| 6,235,815 B1 * | 5/2001 | Loercks | .................. | B32B 27/10 524/47 |
| 7,820,276 B2 | 10/2010 | Sukigara et al. | | |
| 2003/0077444 A1 * | 4/2003 | Bond | ........................ | D01F 8/06 428/364 |
| 2007/0092745 A1 * | 4/2007 | Nie | .......................... | C08J 5/043 428/480 |
| 2007/0231554 A1 * | 10/2007 | Bastioli | ................ | A01K 15/026 428/219 |
| 2008/0147034 A1 * | 6/2008 | Wang | ................ | A61F 13/15252 604/370 |
| 2010/0311905 A1 * | 12/2010 | Mentink | ............ | C08G 18/0895 525/54.31 |
| 2011/0177275 A1 * | 7/2011 | Morris | ........................ | C08J 5/18 428/36.92 |
| 2011/0311743 A1 * | 12/2011 | Kaneko | ...................... | C08J 5/18 428/35.5 |
| 2012/0157582 A1 * | 6/2012 | Broyles | .................... | C08K 3/30 524/52 |
| 2017/0204229 A1 * | 7/2017 | Yuan | .......................... | C08J 3/18 |

FOREIGN PATENT DOCUMENTS

| | | | |
|---|---|---|---|
| EP | 2 727 952 A1 | 5/2014 | |
| WO | WO 2010/010282 A1 | 1/2010 | |

OTHER PUBLICATIONS

Shirai et al. (Materials Science and Engineering C 33 (2013) 4112-4117) (Year: 2013).*
Olivato et al. (Carbohydrate Polymer 90 (2012) 159-164) (Year: 2012).*
Wang et al., Journal of Applied Polymer Science, vol. 82, 1761-1767 (2001) (Year: 2001).*

* cited by examiner

*Primary Examiner* — Liam J Heincer
(74) *Attorney, Agent, or Firm* — Oliff PLC

(57) ABSTRACT

The invention relates to a composition comprising: at least one aliphatic polyester (A) comprising diols containing at least ethylene glycol, 1,4-butanediol or mixtures thereof and diacids containing at least succinic acid, adipic acid or mixtures thereof; at least one starch (B); at least one organic plasticiser (C) for starch; optionally, an additional polyester or a mixture of additional polyesters (D) different from polyester (A). The composition is characterised in that it also comprises citric acid (E), the amount by weight of citric acid varying between 0.01 and 0.45 parts per 100 parts of the total dry weight of (A), (B), (C) and (D).

14 Claims, 1 Drawing Sheet

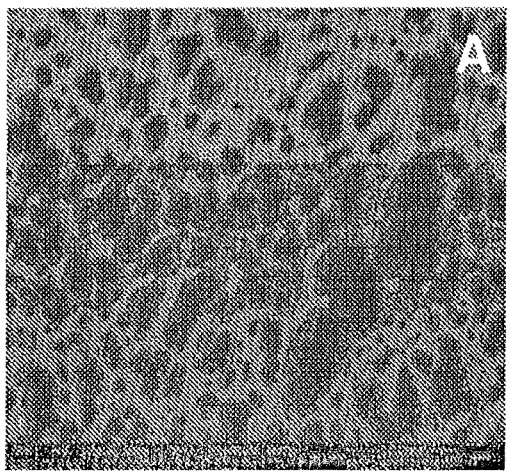
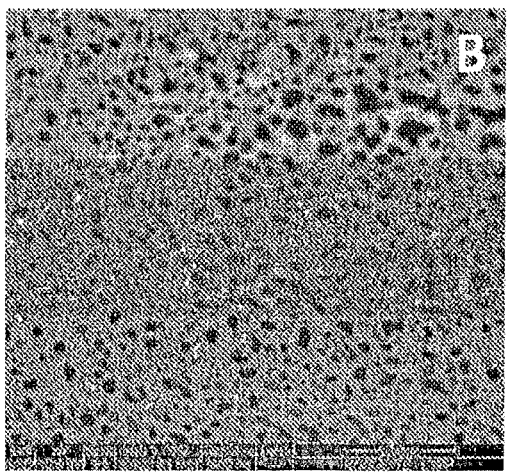
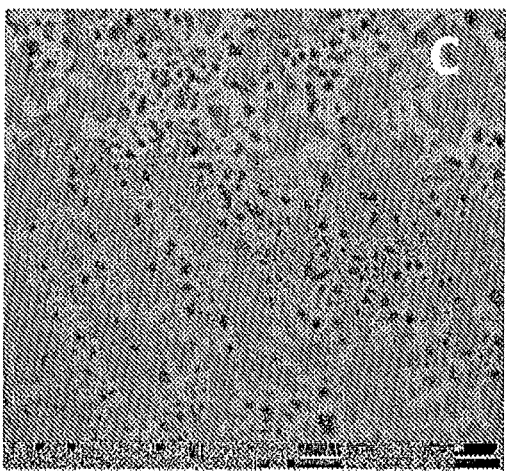

US 10,822,491 B2

COMPOSITION OF POLYESTER AND THERMOPLASTIC STARCH, HAVING IMPROVED MECHANICAL PROPERTIES

This application is a national stage of International Application No. PCT/FR2015/053100, filed on Nov. 17, 2015, which claims the benefit of French Patent Application 1461080, filed Nov. 17, 2014, which claims the benefit of French Patent Application 1461081, filed Nov. 17, 2014, which claims the benefit of French Patent Application 1461082, filed Nov. 17, 2014, and which claims the benefit of French Patent Application 1554884, filed May 29, 2015, the contents of each of which are incorporated herein by reference.

FIELD OF THE INVENTION

A subject of the invention is a thermoplastic composition comprising thermoplastic starch, an aliphatic polyester and at least citric acid. A subject of the invention is also a manufacturing process for manufacturing said composition and a granule of the composition.

TECHNICAL BACKGROUND OF THE INVENTION

Because of their numerous advantages, plastics have become inescapable in the mass manufacture of objects. Indeed, because of their thermoplastic nature, it is possible to manufacture objects of any type from these polymers, at a high rate. To manufacture these objects, small pieces of these thermoplastic polymers are used, generally in the form of granules, that are melted by providing heat and mechanical stresses in forming machines. For example, it is possible to manufacture film by introducing these granules into a blown film extruder or a flat die extruder (cast extrusion) or else to manufacture bottles by introducing these granules into a blow-molding extruder. These granules are produced by granulation of a rod of extruded polymer.

These objects are generally made of non-biodegradable thermoplastics, such as polyolefins or polyamides. However, these plastics are still today not recycled a great deal. Thus, this causes environmental problems since they are generally incinerated and this incineration can cause toxic gases to be given off. Thus, one of the important preoccupations today in the polymer field is to provide polymers which are biodegradable or at least compostable.

Among the biodegradable and/or compostable polymers, mention may be made of aliphatic polyesters or semi-aliphatic polyesters, such as poly(butylene succinate) (PBS), poly(butylene succinate-co-adipate) (PBSA), poly-ε-caprolactone (pCAPA), polylactic acid (PLA) or poly(butylene adipate-co-terephthalate) (PBAT) and also polyhydroxyalkanoates of polyhydroxybutyrate (PHB) or poly(hydroxy butyrate-co-valerate) (PHVB) type. Aliphatic and semi-aliphatic polyesters generally have melting points close to those of polyolefins, thereby allowing, inter alia, their use in the fields of films and packaging, the biodegradability of which is an obvious advantage for single-use applications.

However, one of the problems of these polyesters is that they are relatively expensive. One of the solutions envisioned for providing biodegradable compositions which are more economical is to manufacture compositions based on thermoplastic starch, this consisting of starch and of a plasticizer for this starch, such as glycerol. Specifically, the manufacture of these compositions is advantageous since starch is one of the biosourced polymers that is naturally the most widespread in the environment. However, these thermoplastic starches have insufficient properties, in particular in terms of water resistance. Furthermore, transforming starch into thermoplastic starch is not easy since it requires the use of substantial constraints and/or temperatures during the thermomechanical mixing, which has a tendency to degrade the thermoplastic starch thus formed.

To counter these drawbacks, compositions based on aliphatic or semi-aliphatic polyesters and on plasticized starch have been developed. In these compositions, the thermoplastic starch phase is generally dispersed in the polyester phase. These compositions have numerous advantages, for instance that of being able to be compostable and/or biodegradable and of having water resistance that is very much improved relative to thermoplastic starch. These compositions are generally manufactured by extrusion. A rod of intimate blend of the two polymers is then obtained, this rod then being passed through a granulator so as to form granules. Such compositions are in particular described in documents EP 2 727 952 A1 and U.S. Pat. No. 7,820,276 B2.

The applicant has been able to note that one of the problems of the compositions based on thermoplastic starch and on aliphatic polyester such as PBS or PBSA is that the thermoplastic starch and this polyester are not very miscible with one another. This results in problems of heterogeneity of the composition, in particular when the amount of thermoplastic starch and/or when the amount of plasticizer in the composition are high. This poses problems of stability of the process and compositions with properties which are not entirely satisfactory. For example, when these compositions are manufactured by extrusion, a rod of polymer is obtained at the extruder outlet, which rod can show visible heterogeneity, linked to the presence of thermoplastic starch and of polyester in the form of domains of significant size.

The applicant has succeeded in providing novel compositions which make it possible to overcome these problems.

SUMMARY OF THE INVENTION

A subject of the invention is thus a composition comprising:
  at least one aliphatic polyester (A) comprising diols containing at least ethylene glycol, 1,4-butanediol or mixtures thereof and diacids containing at least succinic acid, and adipic acid or mixtures thereof;
  at least one starch (B);
  at least one organic plasticizer (C) for starch;
  optionally one or more additional polyesters (D) different than the polyester (A);
  wherein the composition also comprises citric acid (E), the amount by weight of citric acid ranging from 0.01 to 0.45 part, these amounts by weight being expressed relative to 100 parts of the total dry matter of (A), (B), (C) and (D).

The applicant has been able to note that, when compositions based on thermoplastic starch and on said aliphatic polyester (A) comprise citric acid in these particular proportions, they exhibit greater homogeneity than the compositions free of this compound.

Furthermore, the applicant has been able to note that, when a composition of this type, but comprising this compound (E) in proportions of 0.5 part or more, is extruded, this rod becomes difficult to granulate. During the granulation, this road then has a tendency to form beads of granules, that is to say granules agglomerated together, and not distinct granules.

The document *Influence of Citric Acid on the Properties of Glycerol-plasticized dry Starch (DTPS) and DTPS/Poly*

(*lactic acid*) *Blends* describes compositions comprising polylactic acid, thermoplastic starch and also citric acid, in proportions that are generally much higher than those of the compositions according to the invention. The extruded compositions described in said document are not granulated.

BRIEF DESCRIPTION OF THE FIGURES

FIG. 1 represents the morphologies, obtained by scanning electron microscopy, of compositions according to the invention and comparative compositions. These compositions were produced according to the protocol described in the Examples section; image A is the composition of example 1 (comparative), image B that of example 3 (according to the invention) and image C that of example 7 (comparative). These images were taken after having extracted the thermoplastic starch by immersing the compositions in hydrochloric acid. The dark marks correspond to the channels of thermoplastic starch that were extracted, while the light zones represent the remaining polyester phase.

DETAILED DESCRIPTION OF THE INVENTION

A subject of the invention is a thermoplastic composition based on a particular aliphatic polyester (A), on starch (B), on plasticizer (C) and on citric acid (E).

A thermoplastic composition is a composition which, reversibly, softens under the action of heat and hardens on cooling to ambient temperature. It has at least one glass transition temperature (Tg) below which the amorphous fraction of the composition is in the brittle vitreous state, and above which the composition may undergo reversible plastic deformations. The glass transition temperature or at least one of the glass transition temperatures of the starch-based thermoplastic composition of the present invention is preferably between −150° C. and 40° C. This starch-based composition may, of course, be formed via processes conventionally used in plastics engineering, such as extrusion, injection, molding, blow-molding and calendering. Its viscosity, measured at a temperature from 100° C. to 200° C. is generally between 10 and $10^6$ Pa·s.

The composition according to the invention also has the advantage of being able to be biodegradable.

The composition according to the invention comprises at least one aliphatic polyester, which is a polyester that comprises exclusively non-aromatic monomers. The term "comprises monomers" is intended to mean that the polyester can be obtained by polycondensation of these monomers. For example, if the polyester comprises succinic acid and 1,4-butanediol, this means that it can be obtained by polycondensation of monomers comprising succinic acid and 1,4-butanediol. It is also specified that, when it is indicated that the polyester comprises x % of a monomer (X), this means that it can be obtained from a mixture of monomers comprising, relative to the total weight of the monomers, x % of monomer (X).

The aliphatic polyester (A) comprises at least diols comprising ethylene glycol, 1,4-butanediol or a mixture thereof and diacids comprising at least succinic acid, adipic acid or a mixture thereof. The polyesters can also be obtained from esters, anhydrides or chlorides of these diacids.

The polyester (A) that is of use in the invention may also comprise additional non-aromatic monomers. They may in particular be additional aliphatic polyols, for example aliphatic diols, preferably saturated linear aliphatic diols. As additional linear aliphatic diol, mention may be made of 1,3-propanediol, 1,5-pentanediol, 1,6-hexanediol, 1,8-octanediol, 1,10-decanediol or a mixture of these diols. They may also comprise additional aliphatic polyacids, for example aliphatic diacids, preferably saturated aliphatic diacids. By way of example, these diacids may be glutaric acid, pimelic acid, suberic acid, azelaic acid, sebacic acid or a mixture of these diacids. It may also be a question of monomers bearing at least one carboxylic acid function and at least one alcohol function, generally hydroxy acids. By way of example, the hydroxy acids comprise glycolic acid or glycolide, lactic acid or lactide, hydroxybutyric acid, hydroxycaproic acid, hydroxyvaleric acid, 7-hydroxyheptanoic acid, 8-hydroxyoctanoic acid, 9-hydroxynonanoic acid, or a mixture of these hydroxy acids.

Relative to the total weight of the polyester (A), the total weight of ethylene glycol, of 1,4-butanediol, of succinic acid and/or of adipic acid advantageously exceeds 90%.

Preferably, the aliphatic polyester (A) comprises 1,4-butanediol and succinic acid and/or adipic acid. The polyester (A) is most preferentially chosen from PBS and PBSA.

According to one variant, the composition also comprises an additional polyester (D), different than the polyester (A), or a blend of additional polyesters (D).

The additional polyester (D), different than the polyester (A), can in particular be any type of aliphatic polyester, insofar as it is not an aliphatic polyester which comprises 1,4-butanediol and succinic acid and/or adipic acid, or any type of semi-aliphatic polyester. The additional aliphatic polyester can be obtained from non-aromatic monomers, said monomers being chosen from aliphatic polyols, aliphatic polyacids and aliphatic monomers bearing at least one carboxylic acid function and at least one alcohol function. These non-aromatic monomers may be linear, cycloaliphatic or branched. It is also possible to obtain these polyesters via enzymatic or fermentation routes, as in the case of the polyhydroxyalkanoates.

These aliphatic polyols are generally aliphatic diols, preferably saturated linear aliphatic diols. As linear aliphatic diol, mention may be made of ethylene glycol, 1,3-propanediol, 1,4-butanediol, 1,5-pentanediol, 1,6-hexanediol, 1,8-octanediol, 1,10-decanediol or a mixture of these aliphatic diols.

The aliphatic polyacids are generally aliphatic diacids, preferably saturated aliphatic diacids. By way of example, these aliphatic diacids may be succinic acid, glutaric acid, adipic acid, pimelic acid, suberic acid, azelaic acid, sebacic acid or a mixture of these diacids.

The monomers bearing at least one carboxylic acid function and at least one alcohol function are generally hydroxy acids. By way of example, the hydroxy acids may be glycolic acid, lactic acid, hydroxybutyric acid, hydroxycaproic acid, hydroxyvaleric acid, 7-hydroxyheptanoic acid, 8-hydroxyoctanoic acid, 9-hydroxynonanoic acid, or a mixture of these hydroxy acids. The polyesters may also be obtained from dilactone such as glycolide, lactide or lactone such as caprolactone.

A semi-aliphatic polyester comprises, for its part, in addition to the aliphatic monomers mentioned above, at least one aromatic monomer which may be a polyol, a polyacid or a monomer bearing at least one carboxylic acid function and at least one alcohol function. This may in particular be an aromatic polyacid, advantageously an aromatic diacid, terephthalic acid or furanic acid, preferably terephthalic acid. The polyesters can also be obtained from esters or chlorides of these polyacids. It is generally considered that a semi-aliphatic polyester comprises, relative to all the monomers, from 50.1 to 99.9 mol % of aliphatic monomers. The semi-aliphatic polyester may in particular be a copolymer comprising 1,4-butanediol, adipic acid and terephthalic acid (PBAT).

The additional polyester (D) is preferentially polylactic acid (PLA). Preferably, this polylactic acid is a semi-crystalline polylactic acid. Polylactic acid is generally obtained by polymerization of lactide, by ring opening. The lactide can be in the form of D-lactide or L-lactide or else in the form of meso-lactide. The crystallinity of the polylactic acid is mainly controlled by the amount of D-lactide and of L-lactide and to a lesser extent by the type of catalyst used. Thus, the polymerization of a racemic mixture of L-lactide and D-lactide generally leads to the synthesis of an amorphous polylactic acid, whereas the polymerization of pure D-lactide or of pure L-lactide leads to the synthesis of a semi-crystalline polylactic acid. A synthesis process using a racemic mixture can also lead to a heterotactic PLA exhibiting crystallinity by using stereospecific catalysts. Preferably, the polylactic acid exhibits a crystallinity or a degree of crystallinity ranging from 30% to 75%, most preferentially from 40% to 60%.

The degree of crystallinity of the PLA can be determined by differential scanning calorimetry analysis on the basis of the calculation of the ratio of the Cp jump values at Tg of the semi-crystalline product that it is sought to characterize and of the same product made completely amorphous.

According to the variant wherein the composition comprises a blend of polyesters (A) and (D), the weight percentage of (D) relative to the weight of (A) and (D), expressed by dry weight, advantageously ranges from 2% to 70%, advantageously from 10% to 50%, preferably from 18% to 30%. According to another embodiment, the weight percentage of (D) relative to the weight of (A) and (D) is low, that is to say that this weight percentage, expressed by dry weight, ranges from 2% to 20%, advantageously according to this mode from 3% to 15%, for example from 4% to 10%.

The various constituents of the composition, in particular the starch, and also the composition obtained, may comprise moisture. The weight proportions can be expressed in the present application either by "dry weight", that is to say that the water possibly included in the constituents or the composition is not taken into consideration for the calculation of the weight proportion, or by "wet weight", that is to say that the water possibly included in the constituents or the composition is taken into consideration for the calculation of the weight proportion.

According to this variant, and in particular according to these preferred sub-variants, it is possible to manufacture films from this composition by blown film extrusion, using particularly high production rates.

Preferably, the polyester(s) (A) and (D) has (have) a flow index ranging from 0.1 to 50 g/10 min, advantageously from 0.5 to 15 g/10 min (ISO 1133, 190° C., 2.16 kg).

The composition according to the invention also comprises starch (B) and an organic plasticizer for starch (C), the two forming thermoplastic starch.

With regard to the starch (B), it may be of any type. If it is desired to obtain a less expensive composition, the starch preferentially used for the manufacture of the composition is a granular starch, preferably a native starch.

The term "granular starch" is intended to mean herein a native or physically, chemically or enzymatically modified starch, which has conserved, within the starch granules, a semicrystalline structure similar to that revealed in the starch grains naturally present in the storage organs and tissues of higher plants, in particular in cereal grains, legume grains, potato or cassava tubers, roots, bulbs, stalks and fruit. In the native state, starch grains generally have a degree of crystallinity that ranges from 15% to 45%, and which depends essentially on the botanical origin of the starch and on the possible treatment that it has undergone.

Granular starch, placed under polarized light, has a characteristic black cross, known as the Maltese cross, typical of the granular state.

According to the invention, the starch may come from any botanical origin, including a granular starch rich in amylose or, conversely, rich in amylopectin (waxy). It may be native starch of cereals such as wheat, maize, barley, triticale, sorghum or rice, tubers such as potato or cassava, or legumes such as pea and soybean, and mixtures of such starches.

The starch may also be modified, chemically or physically.

The function of the organic plasticizer for starch (C) is to make the starch thermoplastic.

It may be an organic plasticizer chosen from diols and polyols such as glycerol, polyglycerols, sorbitans, sorbitol, mannitol, and hydrogenated glucose syrups, urea, polyethers with a molar mass below 800 g/mol, and any mixtures of these products, preferably glycerol, sorbitol or a mixture of glycerol and sorbitol.

According to the invention, the composition may comprise relatively high amounts of plasticizer. Thus, advantageously, the starch/plasticizer weight ratio, expressed by dry weight, ranges from 90/10 to 40/60, for example from 85/15 to 40/60, advantageously from 85/15 to 50/50, preferably from 80/20 to 60/40. The range from 90/10 to 40/60 can be broken down into two sub-ranges: a sub-range from 90/10 to 85/15 (85/15 limit excluded) and a sub-range from 85/15 to 40/60. According to another preferred embodiment, the starch (B)/organic plasticizer (C) weight ratio, expressed by dry weight, ranges from 90/10 to 80/20, or even from 90/10 to 85/15 (85/15 limit excluded). According to this mode, the weight percentage of (D) relative to the weight of (A) and (D) is preferably low. The compositions of this preferred mode make it possible to be subsequently converted, for example in the form of a film, without any fumes being given off during the conversion. Moreover, the films obtained exhibit excellent mechanical properties, in particular when the amount of (D) is low.

Even when the amounts of plasticizer are high, the composition according to the invention can be easily converted in the form of a film by blown film extrusion. It can in particular be converted at high rate in the preferred variants. The composition then also exhibits a greater flexibility.

According to the invention, the composition may comprise very variable amounts of thermoplastic starch. Thus, the total amount by weight of polyester (A) and of optional additional polyester (D) can range from 35 to 75 parts, these amounts by weight being expressed relative to 100 parts of the total dry matter of (A), (B), (C) and (D). It may comprise a total amount by weight of polyester (A) and of optional additional polyester (D) ranging from 40 to 70 parts, advantageously in the range of from 40 to 60 parts, preferably in the range of from 48 to 58 parts.

The composition according to the invention can be characterized by a morphology which is in the form of co-continuous domains of thermoplastic starch and of polyester. The morphology of the composition can be observed by scanning electron microscopy.

Even when the amounts of thermoplastic starch are high, the composition according to the invention may be in the form of granules, without said granules forming beads. In certain proportions such as those defined above, the morphology of the composition exhibits co-continuous domains of polyester and of thermoplastic starch. These compositions exhibit improved biodegradability compared with compositions in which the thermoplastic starch is dispersed in a continuous phase of polyester.

According to another preferred mode, the composition comprises a total amount by weight of polyester (A) and of optional additional polyester (D) included in the range of from 60 to 75 parts, preferentially from 62 to 72 parts, these amounts by weight being expressed relative to 100 parts of the total dry weight of the constituents (A), (B), (C) and (D). Generally, this composition is characterized by a morphology which is in the form of thermoplastic starch domains dispersed in a polyester matrix. According to this mode, the films obtained from these compositions exhibit better tear strength properties.

According to the invention, the composition also comprises citric acid (E), the amount by weight of citric acid ranging from 0.01 to 0.45 part, this amount being expressed relative to 100 parts of the total dry matter of (A), (B), (C) and (D). Advantageously, the composition comprises, relative to 100 parts of the total dry matter of (A), (B), (C) and (D), an amount of citric acid of from 0.05 to 0.3 part, preferentially from 0.06 to 0.20 part, most preferentially from 0.07 to 0.15 part.

As indicated above, the presence of citric acid in the composition makes it possible to improve the homogeneity thereof and thus to improve the properties of the composition. In the citric acid proportions selected and particularly in the preferred proportions, the composition is easy to granulate, in comparison with the compositions based on polyester (A) and on thermoplastic starch comprising larger amounts of citric acid.

The composition according to the invention may also comprise additives or additional polymers (additional constituents) or a blend thereof.

The composition according to the invention can likewise also comprise a bonding agent different than citric acid, this bonding agent bearing several functions capable of reacting with the polyester and/or the starch and/or the organic plasticizer for starch, it being possible for this function to be chosen from carboxylic acid, carboxylic acid ester, isocyanate or epoxy functions.

The composition according to the present invention can also comprise, as another additive or additional constituent, fillers or fibers of organic or inorganic nature, which are optionally nanometric and optionally functionalized. They may be silicas, zeolites, glass fibers or beads, clays, mica, titanates, silicates, graphite, calcium carbonate, talc, carbon nanotubes, wood fibers, carbon fibers, polymer fibers, proteins, cellulose-based fibers, lignocellulosic fibers and nondestructured granular starch. These fillers or fibers can make it possible to improve the hardness, the rigidity or the water- or gas-permeability. Preferably, for 100 parts of (A), (B), (C) and (D), the composition comprises from 0.1 to 200 parts of fillers and/or fibers, this amount being expressed relative to the dry weight of the various constituents, for example from 0.5 to 50 parts. The composition may also be of composite type, i.e. may comprise large amounts of these fillers and/or fibers.

The additional additive that is of use in the composition according to the invention may also be chosen from opacifiers, dyes and pigments. They may be chosen from cobalt acetate and the following compounds: HS-325 Sandoplast® Red BB (which is a compound bearing an azo function, also known under the name Solvent Red 195), HS-510 Sandoplast® Blue 2B which is an anthraquinone, Polysynthren® Blue R, and Clariant® RSB Violet.

The composition may also comprise, as additive, a processing aid, for reducing the pressure in the processing tool. These aids can also have the function of demolding agents making it possible to reduce the adhesion to the materials for forming the composition, such as molds or calendering cylinders. These aids may be selected from fatty acid esters and fatty acid amides, metal salts, soaps, paraffins and hydrocarbon-based waxes. Particular examples of these aids are zinc stearate, calcium stearate, aluminum stearate, stearamides, erucamide, behenamide, beeswaxes or candelilla wax. Preferably, the composition also comprises a monoester of a fatty acid and of glycerol, for example glyceryl monostearate. According to this preferred variant, this composition allows the manufacture of films that are less tacky than compositions free of this constituent. Preferably, the amount by weight of processing aid, and in particular of monoester of a fatty acid and of glycerol, ranges from 0.05 to 1.7 parts, for example from 0.3 to 1.65 parts, advantageously from 0.5 to 1.5 parts, preferentially from 0.65 to 1.3 parts, these amounts being expressed relative to 100 parts of the total dry matter of (A), (B), (C) and (D).

The composition according to the invention may also comprise other additives, such as stabilizers, for example light stabilizers, UV stabilizers and heat stabilizers, fluidizers, flame retardants and antistatic agents. It may also comprise primary and/or secondary antioxidants. The primary antioxidant may be a sterically hindered phenol, such as the compounds Hostanox® 0 3, Hostanox® 0 10, Hostanox® 0 16, Ultranox® 210, Ultranox®276, Dovernox® 10, Dovernox® 76, Dovernox® 3114, Irganox® 1010 or Irganox® 1076. The secondary antioxidant may be trivalent phosphorus compounds such as Ultranox® 626, Doverphos® S-9228, Hostanox® P-EPQ or Irgafos® 168.

The composition may also comprise an additional polymer, different than the polyesters (A) and (D). This polymer may be chosen from polyamides, polystyrene, styrene copolymers, styrene-acrylonitrile copolymers, styrene-acrylonitrile-butadiene copolymers, poly(methyl methacrylate)s, acrylic copolymers, poly(ether-imide)s, poly(phenylene oxide)s, such as poly(2,6-dimethylphenylene oxide), poly (phenylene sulfate)s, poly(ester-carbonate)s, polycarbonates, polysulfones, polysulfone ethers, polyether ketones, and mixtures of these polymers.

The composition may also comprise, as additional polymer, a polymer for improving the impact properties of the polymer, in particular functional polyolefins such as functionalized ethylene or propylene polymers and copolymers, core-shell copolymers or block copolymers.

The compositions according to the invention may also comprise polymers of natural origin, such as cellulose, chitosans, alginates, carrageenans, agar-agar, proteins such as gluten, pea proteins, casein, collagen, gelatin or lignin, these polymers of natural origin possibly being physically or chemically modified.

According to one variant of the invention, the composition comprises by dry weight:
  from 10 to 80 parts of at least one polyester (A), preferably from 30 to 65 parts, most preferentially from 30 to 50 parts;
  from 5 to 50 parts of at least one starch (B), preferably from 20 to 40 parts;
  from 5 to 50 parts of at least one organic plasticizer (C) for starch, preferably from 10 to 35 parts;

optionally from 1 to 70 parts of additional polyester (D), preferably from 5 to 35 parts;

the sum of the amounts of constituents (A), (B), (C) and (D) coming to 100 parts;

the composition also comprising:

from 0.01 to 0.45 part of citric acid (E), advantageously from 0.05 to 0.3 part, preferentially from 0.06 to 0.20 part, most preferably from 0.07 to 0.15 part;

optionally from 0.01 to 200 parts of additional constituent(s) chosen from the additives and polymers, different than (A), (B), (C), (D) and (E).

The composition according to the invention can be manufactured using a manufacturing process comprising:

a step a) of introducing into a mixing system constituents comprising at least one aliphatic polyester (A) as defined above, at least one starch (B), at least one organic plasticizer for starch (C), optionally one or more additional polyesters (D), at least citric acid (E) and optionally water;

a mixing step b) in which the constituents are thermomechanically mixed so as to obtain the thermoplastic composition;

a step c) of recovering the thermoplastic composition.

The amounts of the various constituents can obviously be varied in such a way as to obtain the compositions described above. In the case where constituents comprising moisture are used, those skilled in the art can easily, in order to carry out the process, determine the amounts by weight of the various constituents by wet weight to be introduced into the mixing system, by measuring beforehand the moisture content in each constituent, for example by carrying out an assay using the Karl-Fisher method, this being in order to obtain the compositions in the proportions described above. By way of illustration, the Examples section contains the description of compositions expressed by dry weight, with the amounts of each of the constituents used during the process which are, for their part, expressed by wet weight.

The process described in WO 2010/010282 A1 may in particular be used to prepare the composition.

The mixing system may comprise a drying system, for example a system for extracting the volatile compounds, such as a vacuum pump. In this case, the moisture content of the composition at the end of the process may be reduced in comparison with the total moisture content of the constituents introduced in step a).

Preferably, the moisture content of the composition is adjusted so as to be between 2.5% and 9% relative to the total weight (thus wet weight) of the constituents introduced in step a).

Advantageously, the process comprises at least one drying step, such that the moisture content of the composition is between 0.2% and 1.4%. Preferably, the mixing of step b) is carried out simultaneously with the drying step, for example by connecting a vacuum pump to the reactor. The process may also comprise a distinct drying step, which takes place subsequent to the recovering step c).

According to the invention, the mixing temperature during step b) advantageously ranges from 90 to 210° C., preferentially from 110 to 190° C.

The mixing of the constituents of the composition may take place under an inert atmosphere.

With regard to the mixing system, it may involve internal blade or rotor mixers, external mixers, or single-screw or co-rotating or counter-rotating twin-screw extruders. Preferably, the mixing step b) takes place in an extruder, in particular using a co-rotating twin-screw extruder. When it is by extrusion, the step a) of introducing the various constituents of the composition can be carried out by means of introduction hoppers located along the extruder.

When the mixing is carried out by extrusion, the composition recovered in step c) is in the form of a rod of polymer.

Preferably, the manufacturing process also comprises a step d) of granulating the composition recovered in step c). At the end of this granulating step d), granules of composition are obtained.

This granulating step can be carried out by means of any type of granulator, for example a water ring granulator, an underwater granulator or a rod granulator. The composition recovered can be very easily granulated, this being without bead formation.

The invention also relates to granules of the composition according to the invention or granules that can be obtained by means of the process described above.

The invention also relates to an article comprising the composition according to the invention.

This article may be of any type and may be obtained using conventional transformation techniques.

It may be, for example, fibers or threads that are of use in the textile industry or other industries. These fibers or threads may be woven so as to form fabrics, or else nonwovens.

The article according to the invention may also be a film or a sheet. These films or sheets may be manufactured by calendering, film cast extrusion or blown film extrusion techniques.

The invention relates in particular to a process for manufacturing a film by film blowing, comprising a step of extruding the composition or granules according to the invention so as to form a molten composition;

a step of forming a blown tube by blowing the molten composition obtained in the following step;

a step of recovering a film.

Advantageously, the drawing speed is greater than 5 m/s, preferably greater than 10 m/s. The compositions according to the invention, in particular in the preferred variants, make it possible to keep excellent production rates and to obtain high drawing speeds, in particular when the composition comprises semi-crystalline polylactic acid as polyester (D).

The article according to the invention may also be a container for transporting gases, liquids and/or solids. The containers concerned may be bottles, for example sparkling or still water bottles, juice bottles, soda bottles, carboys, alcoholic drink bottles, small bottles, for example small medicine bottles, small bottles for cosmetic products, dishes, for example for ready meals, microwave dishes, or lids. These containers may be of any size. They may be manufactured by extrusion-blow molding, thermoforming or injection-blow molding.

The articles may also be multilayer articles, at least one layer of which comprises the composition according to the invention. These articles may be manufactured via a process comprising a coextrusion step in the case where the materials of the various layers are brought into contact in the molten state. By way of example, mention may be made of the techniques of tube coextrusion, profile coextrusion, coextrusion blow-molding of a bottle, a small bottle or a tank, generally collated under the term "coextrusion blow-molding of hollow bodies", coextrusion blow-molding also known as film blowing, and cast coextrusion.

They may also be manufactured according to a process comprising a step of applying a layer of molten composition onto a layer based on organic polymer, paper, metal or adhesive composition in the solid state. This step may be performed by pressing, by overmolding, stratification or lamination, extrusion-lamination, coating, extrusion-coating or spreading.

The invention will now be illustrated in the examples hereinafter. It is pointed out that these examples do not in any way limit the present invention.

EXAMPLES

Constituents

The constituents of the various compositions illustrated are presented below.

Polyesters:

(A): Aliphatic polyester from condensation of succinic acid, of adipic acid and of 1,4-butanediol, melting point of 95° C., flow index equal to 1.2 g/10 min.

(D): Semi-crystalline poly(lactic acid) (L-lactic acid content equal to 95.7 mol %, D-lactic acid content equal to 4.3 mol %, melting point of 150° C., flow index equal to 2.6 g/10 min).

(B): Wheat starch (containing 12.5% water).

(C): Plasticizer

Plasticizer a: Mixture of glycerol and sorbitol containing 16% of water with the distribution by dry weight glycerol=60%, sorbitol=40%.

Plasticizer b=Glycerol (E)=Citric acid

Additional Constituents/Additives

GMS=Glyceryl monostearate

Composition Manufacturing Process

The compositions according to the invention and the comparative compositions were prepared using an extruder of the Leistritz brand, ZSE27MAXX60D, Diameter 28, Length L/D=60, for a flow rate of: 20 kg/h.

Temperature profile (fifteen heating zones Z1 to Z15, temperature in ° C.): 20/60/60/80/90/110/130/130/180/160/180/150/130/130/130 with a variable screw speed of 200 rpm to 400 rpm.

In the case where the composition envisioned comprises an additional polyester (D), physical mixing of the granules of the polyesters (A) and (D) is carried out prior to the introduction into the extruder.

During the process, the following are introduced into the extruder:

the blend of the polyester (A) and additional polyester (D) in the main hopper of the extruder, following which said blend passes through all of the heating zones of the extruder, the plasticizer for starch (C) in zone Z3 (9 to 12 D), the starch, and also optionally the citric acid and the glyceryl monostearate in zone Z4 (13 to 16 D).

A partial vacuum is applied in zone Z9 (33-36 D) and in zone 11 (41-44D) (vacuum of 100 mbar) making it possible to remove the water.

The granules are obtained by means of a conventional underwater granulation system.

The granules are dried in a basket dryer for 2 hours at 80° C. Moisture content is assayed using the Karl-Fisher method. All the compositions obtained have a moisture content of approximately 0.5%.

Details of the Compositions

The compositions according to the invention and the comparative compositions were prepared using the process described above. The amounts of the various constituents introduced into the extruder are given in Table 1. The proportions of all the constituents are given relative to the wet weight of the sum of the constituents (A), (B) and (C) and the additional constituent (D).

In order to facilitate reading, it is specified in the "TYPE" column of each of the tables below whether the composition is a composition according to the invention (EX) or a comparative composition (CP).

TABLE 1

Proportion of the constituents of the compositions by wet weight introduced into the extruder

| Example | TYPE | (A) | (D) | (B) | (C) | (E) | (GMS) |
|---|---|---|---|---|---|---|---|
| 1 | CP | 44.28 | 0 | 33.43 | 22.29[a] | 0 | 0 |
| 2 | EX | 44.28 | 0 | 33.43 | 22.29[a] | 0.09 | 0 |
| 3 | EX | 44.28 | 0 | 33.43 | 22.29[a] | 0.18 | 0 |
| 4 | EX | 44.28 | 0 | 33.43 | 22.29[a] | 0.28 | 0 |
| 5 | CP | 44.28 | 0 | 33.43 | 22.29[a] | 0.46 | 0 |
| 6 | CP | 44.28 | 0 | 33.43 | 22.29[a] | 0.64 | 0 |
| 7 | CP | 44.28 | 0 | 33.43 | 22.29[a] | 0.91 | 0 |
| 8 | CP | 31 | 13.28 | 33.43 | 22.29[a] | 0 | 0.28 |
| 9 | EX | 31 | 13.28 | 33.43 | 22.29[a] | 0.07 | 0.28 |
| 10 | EX | 31 | 13.28 | 33.43 | 22.29[a] | 0.09 | 0.28 |
| 11 | EX | 31 | 13.28 | 33.43 | 22.29[a] | 0.18 | 0.28 |
| 12 | EX | 31 | 13.28 | 33.43 | 22.29[a] | 0.28 | 0.28 |
| 13 | CP | 37.03 | 15.87 | 30.62 | 16.49[b] | 0 | 0.95 |
| 14 | CP | 33.52 | 14.36 | 33.88 | 18.24[b] | 0 | 0.95 |
| 15 | CP | 32.12 | 13.77 | 35.17 | 18.94[b] | 0 | 0.95 |
| 16 | CP | 30.04 | 12.87 | 37.11 | 19.98[b] | 0 | 0.94 |
| 17 | CP | 26.59 | 11.4 | 40.31 | 21.71[b] | 0 | 0.94 |
| 18 | EX | 37.03 | 15.87 | 30.62 | 16.49[b] | 0.1 | 0.95 |
| 19 | EX | 33.52 | 14.36 | 33.88 | 18.24[b] | 0.09 | 0.95 |
| 20 | EX | 32.12 | 13.77 | 35.17 | 18.94[b] | 0.09 | 0.95 |
| 21 | EX | 30.04 | 12.87 | 37.11 | 19.98[b] | 0.09 | 0.94 |
| 22 | EX | 26.59 | 11.4 | 40.31 | 21.71[b] | 0.09 | 0.94 |

[a]Plasticizer a used
[b]Plasticizer b used

Table 2 expresses the proportions by weight of the various constituents of the composition recovered in the form of dry granules, these amounts being expressed relative to 100 parts of the total dry weight of (A), (B), (C) and (D).

TABLE 2

Proportion of constituents of the dry compositions

| Composition | TYPE | (A) | (D) | (B) | (C) | (E) Citric acid | Additive (GMS) |
|---|---|---|---|---|---|---|---|
| 1 | CP | 48 | 0 | 31.7 | 20.3[a] | 0 | 0 |
| 2 | EX | 48 | 0 | 31.7 | 20.3[a] | 0.1 | 0 |
| 3 | EX | 48 | 0 | 31.7 | 20.3[a] | 0.2 | 0 |
| 4 | EX | 48 | 0 | 31.7 | 20.3[a] | 0.3 | 0 |
| 5 | CP | 48 | 0 | 31.7 | 20.3[a] | 0.5 | 0 |
| 6 | CP | 48 | 0 | 31.7 | 20.3[a] | 0.7 | 0 |
| 7 | CP | 48 | 0 | 31.7 | 20.3[a] | 1 | 0 |
| 8 | CP | 33.6 | 14.4 | 31.71 | 20.29[a] | 0 | 0.3 |
| 9 | EX | 33.6 | 14.4 | 31.71 | 20.29[a] | 0.08 | 0.3 |
| 10 | EX | 33.6 | 14.4 | 31.71 | 20.29[a] | 0.1 | 0.3 |
| 11 | EX | 33.6 | 14.4 | 31.71 | 20.29[a] | 0.2 | 0.3 |
| 12 | EX | 33.6 | 14.4 | 31.71 | 20.29[a] | 0.3 | 0.3 |
| 13 | CP | 38.5 | 16.5 | 27.86 | 17.14[b] | 0 | 1 |
| 14 | CP | 35 | 15 | 30.95 | 19.05[b] | 0 | 1 |
| 15 | CP | 33.6 | 14.4 | 32.19 | 19.81[b] | 0 | 1 |
| 16 | CP | 31.5 | 13.5 | 34.05 | 20.95[b] | 0 | 1 |
| 17 | CP | 28 | 12 | 37.14 | 22.86[b] | 0 | 1 |
| 18 | EX | 38.5 | 16.5 | 27.86 | 17.14[b] | 0.1 | 1 |
| 19 | EX | 35 | 15 | 30.95 | 19.05[b] | 0.1 | 1 |
| 20 | EX | 33.6 | 14.4 | 32.19 | 19.81[b] | 0.1 | 1 |
| 21 | EX | 31.5 | 13.5 | 34.05 | 20.95[b] | 0.1 | 1 |
| 22 | EX | 28 | 12 | 37.14 | 22.86[b] | 0.1 | 1 |

[a]Plasticizer a used
[b]Plasticizer b used

Characterization of Compositions 1 to 7

Examples 1 to 7 demonstrate the benefits of the composition according to the invention: various compositions, which differ solely by the amount of citric acid used, are thus compared.

The morphologies of the compositions were observed under a scanning electron microscope and the images of compositions 1, 3 and 7 are reproduced in FIG. 1. The average size of the thermoplastic starch channels is also determined using the SEM images and reported in table 3. The properties of the compositions of these examples are collated in Table 3.

TABLE 3

Effect of the amount of citric acid used on the quality of the extrudate and on the morphology of the compositions

| Composition | TYPE | Granulation | Die deposit | Rod regularity | Average diameter of the channels formed by the plasticized starch phase |
|---|---|---|---|---|---|
| 1 | CP | ++ | ++ | -- | 2 µm << 10 µm |
| 2 | EX | ++ | ++ | - | 2 µm << 7 µm |
| 3 | EX | + | + | + | 1 µm << 4 µm |
| 4 | EX | + | + | + | 0 µm << 3 µm |
| 5 | CP | - | - | ++ | 0 µm << 2 µm |
| 6 | CP | - | - | ++ | 0 µm << 1.5 µm |
| 7 | CP | - | - | ++ | 0 µm << 1.5 µm |

Granulation
++: No granule stuck
+: a few granules stick to one another
-: granule agglomerates (beads)
Die deposit
++: No deposit
+: A few deposits
-: Significant deposits
Rod regularity
++: Smooth
+: A few bumps
-: Rough
--: Very rough The compositions of the examples, in which the amount by weight of citric acid varies from 0 to 1 part relative to 100 parts of the total dry weight of (A), (B), (C) and (D), show that:

The use of citric acid makes it possible to improve the compatibility between the polyester phase and the plasticized starch phase. This better compatibility between the phases is illustrated by the decrease in the size of the channels formed by the plasticized starch. This is because, at identical plasticized starch content, the smoother the channels, the greater the contact surface area between the polyester and starchy phases.

However, these results show that it is not sufficient to decrease the size of the thermoplastic starch domains to improve the properties of the composition. The use of citric acid has a strong impact on the properties of the molten polymer at the extruder outlet. Indeed, according to table 3, the use of citric acid makes it possible to improve the rod regularity while at the same time greatly reducing the presence of deposit on the die. However, the citric acid also leads to difficulties in granulating when it is used in proportions of 0.5 part or more.

Characterization of Compositions 8 to 12

These compositions differ from the compositions described in examples 1 to 7 in that they contain an additional polyester (D) (polylactic acid). Compositions 8 to 12 differ from one another in terms of the choice of the amount of citric acid used.

Table 4 indicates the capacity of the rod obtained after extrusion to be granulated.

The granules of the compositions are converted into films on a blow-molding extruder of the Collin brand (Diameter 20, Length LID=18, five heating zones Z1 to Z5) using the following temperature profile (160° C./160° C./160° C./160° C./160° C.) and a screw speed of 60 revolutions per minute.

Table 4 also indicates the maximum speed of film manufacture of the composition, said speed being determined relative to the maximum operating speed of the blow-molding extruder. The mechanical properties and the appearance of the films obtained were also characterized and reported. The term "heterogeneous film" is intended to mean a film in which the thickness and/or the translucency of the film is variable; the term "homogeneous film" is intended to mean a film with a constant thickness and translucency.

TABLE 4

Effect of the amount of citric acid used: behavior during processing by extrusion blow molding and mechanical properties of the compositions in the form of test specimens cut from a 50 µm film.

| Composition | TYPE | Granulation | Processing speed (m/s) | Appearance Of the film | Overall film-forming ability | Modulus (MPa) | Elongation at break (%) | Tensile strength (MPa) |
|---|---|---|---|---|---|---|---|---|
| 8 | | ++ | 13 | Heterogeneous film | - | Poor film, no mechanical property measurement | | |
| 9 | EX | ++ | 13 | Homogeneous film | + | 299 | 278 | 20.8 |
| 10 | EX | ++ | 13 | Homogeneous film | ++ | 294 | 268 | 18 |
| 11 | EX | + | 9.5 | Homogeneous film | 0 | 246 | 199 | 15.3 |
| 12 | EX | + | 6 | Homogeneous film | 0 | 241 | 184 | 14.7 |

Film-forming ability grading
++: No bubble stability problem
+: No stability problem after reduction of the processing speed
0: Bubble slightly unstable after reduction of the processing speed
-: Bubble unstable even after reduction of the processing speed The compositions of examples 8 to 12, in which the citric acid content varies from 0 to 0.3 part by weight relative to 100 parts of the total dry weight of (A), (B), (C) and (D), show that:

The use of citric acid leads to a decrease in the modulus values and the elongation at break values starting from 0.2 part. For contents of less than 0.2 part of citric acid, the mechanical properties are stable.

The use of citric acid at a level greater than or equal to 0.2 part causes a decrease in the film processing speed. Moreover, the non-use of citric acid leads to the formation of a very heterogeneous film.

The use of citric acid in proportions of between 0.08 and 0.18 part makes it possible, for the formulae described in examples 8 to 12, to obtain the best granulation qualities, processing qualities and film use property qualities.

Characterization of Compositions 13 to 22

The compositions of examples 13 to 22 differ from the compositions described in examples 1 to 12 in that the plasticizer for starch that is used is glycerol. These compositions differ from one another by 1) the amount of plasticized starch used and also 2) the level of citric acid.

These compositions were converted into film form according to the protocol described above. Indicated in table 5 is the maximum speed of film manufacture for the composition. The mechanical properties and the appearance of the films obtained were also characterized and reported.

modulus, in the elongation at break and in the tensile strength) and in its appearance (homogeneous film).

CONCLUSION

On the basis of the analytical results of the compositions free of additional polyester (D) (table 3), it appears that the use of citric acid makes it possible to improve the compatibility of the starchy and polyester phases. It also makes it possible to improve the quality and the homogeneity of the rod at the extrusion outlet and thus the appearance of the granules. However, in the presence of 0.3 part or more of citric acid, granulation of the material is more difficult or even impossible.

On the basis of the analytical results of the compositions comprising the additional polyester (D) (table 4), the use of citric acid in proportions greater than or equal to 0.2 part leads to a considerable decrease in the capacity of the material to be made into a film at high rate.

On the basis of the analytical results of compositions 13 to 22 (table 5), it clearly appears that the use of citric acid in an amount of 0.1 part leads to a considerable improvement in the quality and the mechanical properties of the films extruded, this being over a wide range of plasticized starch contents.

TABLE 5

Effect of the amounts of plasticized starch and citric acid used

| Composition | TYPE | Processing speed (m/s) | Appearance of the film | Overall film-forming ability | Modulus (MPa) | Elongation at break (%) | Tensile strength (MPa) |
|---|---|---|---|---|---|---|---|
| 13 | CP | 13 | Heterogeneous film | Poor | 149 | 263 | 17 |
| 14 | CP | 13 | Heterogeneous film | Poor | 131 | 195 | 16 |
| 15 | CP | 4.5 | Heterogeneous film | Poor | Poor film, no mechanical property measurement | | |
| 16 | CP | 4.5 | Heterogeneous film | Poor | | | |
| 17 | CP | 2.3 | Heterogeneous film | Poor | | | |
| 18 | EX | 13 | Homogeneous film | Excellent | 250 | 405 | 35 |
| 19 | EX | 13 | Homogeneous film | Excellent | 235 | 475 | 34 |
| 20 | EX | 13 | Homogeneous film | Excellent | 203 | 325 | 31 |
| 21 | EX | 13 | Homogeneous film | Excellent | 166 | 290 | 23 |
| 22 | EX | 11 | Homogeneous film | Medium | 147 | 265 | 18 |

The compositions of table 5, in which the amount by weight of citric acid is from 0 to 0.1 part and the plasticized starch content ranges from 45 parts to 60 parts, these amounts or contents being expressed relative to 100 parts of the total dry matter of (A), (B), (C) and (D), show that:

the use of citric acid in an amount of 0.1 part makes it possible to obtain a very good film-forming ability of the formulations containing between 45% and 55 parts of plasticized starch or to make a composition comprising 60 parts of thermoplastic starch, able to form a film.

at identical plasticized starch content, the use of citric acid and 0.1 part leads to a strong improvement in the mechanical properties of the film (increase in the

The invention claimed is:

1. A composition comprising:
   at least one aliphatic polyester (A) comprising diols containing at least ethylene glycol, 1,4-butanediol or mixtures thereof and diacids containing at least succinic acid, adipic acid or mixtures thereof;
   at least one starch (B);
   at least one organic plasticizer (C) for starch;
   an additional polyester or a blend of additional polyesters (D) different than the polyester (A) that comprises semi-crystalline polylactic acid, where the degree of crystallinity of the semi-crystalline polylactic acid ranges from 30% to 75%; and citric acid (E) ranging from 0.08 to 0.18 parts relative to 100 parts of the total dry weight of (A), (B), (C) and (D); wherein the weight percentage of (D), relative to the weight of (A) and (D), expressed in dry weight, ranges from 2% to 70%.

2. The composition according to claim 1, wherein the starch/plasticizer weight ratio, expressed by dry weight, ranges from 90/10 to 40/60.

3. The composition according to claim 1, wherein the amount by weight of polyester (A) and of additional polyester (D) is in the range of from 35 to 75 parts relative to 100 parts of the total dry weight of constituents (A), (B), (C) and (D).

4. The composition according to claim 1, further comprising a monoester of a fatty acid and of glycerol.

5. The composition according to claim 1, wherein the plasticizer comprises diols and polyols, including glycerol, polyglycerols, sorbitans, sorbitol, mannitol, and hydrogenated glucose syrups, urea, polyethers with a molar mass below 800 g/mol, and any mixtures of these products.

6. The composition according to claim 1 having a morphology comprising co-continuous domains of thermoplastic starch and of polyester.

7. The composition according to claim 1, wherein the semi-crystalline polylactic acid is present at 12 to 16.5 parts relative to 100 parts of the total dry weight of (A), (B), (C), (D) and (E).

8. A process for preparing the composition of claim 1, comprising:
  introducing into a mixing system constituents comprising
    at least one aliphatic polyester (A) comprising diols containing at least ethylene glycol, 1,4-butanediol or mixtures thereof and diacids containing at least succinic acid, adipic acid or mixtures thereof,
    at least one starch (B),
    at least one organic plasticizer for starch (C),
    one or more additional polyesters (D), the one or more additional polyesters (D) comprising semi-crystalline polylactic acid, where the degree of crystallinity of the semi-crystalline polylactic acid ranges from 30% to 75%,
    citric acid (E) ranging from 0.08 to 0.18 parts relative to 100 parts of the total dry weight of (A), (B), (C) and (D), and
    optionally water;
  mixing the constituents thermomechanically to obtain the thermoplastic composition; and, recovering the thermoplastic composition.

9. The process according to claim 8, wherein: water is present and moisture of said introduced constituents is adjusted to be between 2.5% and 9%; and wherein the mixing is carried out simultaneously with drying, to provide a thermoplastic composition having a moisture content between 0.2% and 1.4%.

10. The process according to claim 8, wherein the mixing temperature ranges from 90 to 210° C.

11. The process according to claim 8, further comprising extruding said constituents to thermomechanically mix the constituents.

12. The process according to claim 8, further comprising granulating said recovered thermoplastic composition.

13. A thermoplastic granule prepared according to the method of claim 12.

14. A composition comprising:
  at least one aliphatic polyester (A) comprising diols containing at least ethylene glycol, 1,4-butanediol or mixtures thereof and diacids containing at least succinic acid, adipic acid or mixtures thereof;
  at least one starch (B);
  at least one organic plasticizer (C) for starch;
  an additional polyester or a blend of additional polyesters (D) different than the polyester (A) that comprises semi-crystalline polylactic acid, where the degree of crystallinity of the semi-crystalline polylactic acid ranges from 30% to 75%; and
  citric acid (E) ranging from 0.08 to 0.18 parts relative to 100 parts of the total dry weight of (A), (B), (C) and (D); wherein
    the starch/plasticizer weight ratio, expressed by dry weight, ranges from 60/40 to 40/60.

* * * * *